United States Patent                    (10) Patent No.:     US 11,824,863 B2
Raman et al.                               (45) Date of Patent:        Nov. 21, 2023

(54) PERFORMING SERVICES ON A HOST

(71) Applicant: Nicira, Inc., Palo Alto, CA (US)

(72) Inventors: Chidambareswaran Raman, Sunnyvale, CA (US); Raju Koganty, San Jose, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 770 days.

(21) Appl. No.: 15/803,364

(22) Filed: Nov. 3, 2017

(65) Prior Publication Data

US 2018/0124061 A1    May 3, 2018

Related U.S. Application Data

(60) Provisional application No. 62/417,068, filed on Nov. 3, 2016.

(51) Int. Cl.
*H04L 9/40*      (2022.01)
*G06F 9/50*      (2006.01)
*G06F 21/53*     (2013.01)
*G06F 9/455*     (2018.01)

(52) U.S. Cl.
CPC .......... *H04L 63/102* (2013.01); *G06F 9/5011* (2013.01); *G06F 9/5077* (2013.01); *G06F 9/45558* (2013.01); *G06F 21/53* (2013.01)

(58) Field of Classification Search
None
See application file for complete search history.

(56) References Cited

U.S. PATENT DOCUMENTS

| | | | | |
|---|---|---|---|---|
| 7,757,231 B2 * | 7/2010 | Anderson | ........... | G06F 9/45533 718/1 |
| 8,370,834 B2 * | 2/2013 | Edwards | ................. | G06F 9/546 718/1 |
| 8,560,663 B2 * | 10/2013 | Baucke | ............... | G06F 9/45558 709/223 |
| 8,594,079 B2 * | 11/2013 | Kwon | ................... | H04L 45/745 370/353 |
| 8,595,480 B2 * | 11/2013 | Dimitrakos | ............. | G06F 21/53 713/153 |
| 8,601,473 B1 * | 12/2013 | Aron | .................... | G06F 9/45533 718/1 |
| 8,830,834 B2 * | 9/2014 | Sharma | ................... | H04L 45/64 370/235 |
| 8,977,842 B1 * | 3/2015 | McCorkendale | ....... | G06F 21/53 380/285 |
| 9,088,524 B2 * | 7/2015 | Kwon | .................... | H04L 49/354 |
| 9,146,764 B1 * | 9/2015 | Wagner | ............... | G06F 9/45533 |
| 9,191,327 B2 * | 11/2015 | Shieh | .................. | H04L 63/0209 |

(Continued)

*Primary Examiner* — Michael W Chao
(74) *Attorney, Agent, or Firm* — ADELI LLP

(57) ABSTRACT

Some embodiments provide a novel method for performing services on a host computer that executes several data compute nodes (DCNs). The method receives, at a module executing on the host, a data message associated with a DCN executing on the host. The method supplies the data message to a service virtual machine (SVM) that executes on the host and on which several service containers execute. One or more of the service containers then perform a set of one or more services on the data message. The method then receives an indication from the SVM that the set of services has been performed on the data message.

20 Claims, 7 Drawing Sheets

(56) References Cited

U.S. PATENT DOCUMENTS

| | | | |
|---|---|---|---|
| 9,678,773 B1* | 6/2017 | Wagner | G06F 9/45533 |
| 9,891,940 B2* | 2/2018 | Feroz | G06F 16/9535 |
| 10,061,613 B1* | 8/2018 | Brooker | G06F 9/5005 |
| 10,599,499 B2* | 3/2020 | Caldato | H04L 67/10 |
| 10,601,807 B2* | 3/2020 | Sweet | H04L 63/08 |
| 11,360,806 B2* | 6/2022 | Radhakrishnan | G06F 9/4856 |
| 11,418,512 B2* | 8/2022 | Li | H04L 61/2575 |
| 2005/0289244 A1* | 12/2005 | Sahu | H04L 67/2819 709/249 |
| 2007/0171904 A1* | 7/2007 | Tchigevsky | H04L 12/4645 370/389 |
| 2009/0222542 A1* | 9/2009 | Miyajima | G06F 9/5077 709/222 |
| 2015/0281134 A1* | 10/2015 | Kwon | H04L 45/021 370/392 |
| 2015/0281178 A1* | 10/2015 | Raman | H04L 63/0227 726/13 |
| 2015/0281179 A1* | 10/2015 | Raman | H04L 63/0272 726/11 |
| 2015/0281180 A1* | 10/2015 | Raman | H04L 63/0272 726/15 |
| 2015/0370586 A1* | 12/2015 | Cooper | G06F 9/45533 710/308 |
| 2015/0379277 A1* | 12/2015 | Thota | G06F 9/45558 713/189 |
| 2016/0092252 A1* | 3/2016 | Wagner | G06F 9/45533 718/1 |
| 2016/0094454 A1* | 3/2016 | Jain | H04L 41/0813 370/235 |
| 2016/0094456 A1* | 3/2016 | Jain | H04L 41/0813 370/235 |
| 2016/0094457 A1* | 3/2016 | Jain | H04L 41/0803 370/235 |
| 2016/0094661 A1* | 3/2016 | Jain | H04L 41/0803 709/227 |
| 2016/0139939 A1* | 5/2016 | Bosch | H04W 4/60 718/1 |
| 2016/0212237 A1* | 7/2016 | Nishijima | H04L 45/22 |
| 2016/0261497 A1* | 9/2016 | Arisoylu | H04L 45/74 |
| 2016/0344803 A1* | 11/2016 | Batz | H04L 12/1407 |
| 2017/0093921 A1* | 3/2017 | Duan | H04L 63/1408 |
| 2017/0170990 A1* | 6/2017 | Gaddehosur | H04L 12/4675 |
| 2017/0177413 A1* | 6/2017 | Wisniewski | G06F 9/5055 |
| 2017/0310611 A1* | 10/2017 | Kumar | H04L 69/00 |
| 2018/0048716 A1* | 2/2018 | Madhayyan | G06F 9/45558 |
| 2018/0123928 A1* | 5/2018 | Moradi | G06F 11/30 |
| 2018/0351824 A1* | 12/2018 | Giust | G06F 9/542 |
| 2019/0229977 A1* | 7/2019 | Bisht | H04L 41/0645 |
| 2019/0288921 A1* | 9/2019 | Chan | H04L 43/0817 |
| 2021/0263788 A1* | 8/2021 | Young | G06F 9/45504 |

* cited by examiner

PERFORMING SERVICES ON A HOST

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts that execute virtual machines (VMs). Some such approaches utilize service virtual machines (SVMs) that execute on hosts concurrently with guest virtual machines. Existing approaches, however, lead to SVM sprawl due to different SVMs running on the same host to provide different middlebox service operations.

BRIEF SUMMARY

Some embodiments provide a novel method for performing services on a host computer that executes several data compute nodes (DCNs). The method receives, at a module executing on the host, a data message associated with a DCN executing on the host. In some embodiments, the module is a port of a software forwarding element (SFE) that executes on the host to forward data messages to and from the DCNs executing on the host from and to DCNs and other machines operating outside of the host. The method supplies the data message to a service virtual machine (SVM) that executes on the host and on which several service containers execute. One or more of the service containers then perform a set of one or more services on the data message. The method then receives an indication from the SVM that the set of services has been performed on the data message. Examples of such services include firewall operations, load balancing operations, intrusion detection operations, other middlebox operations, etc.

In some embodiments, the method forwards the data message to the data message's destination after receiving the indication from the SVM. The data message's destination in some embodiments can be a DCN executing on the host, or a DCN or other machine operating outside of the host. Instead of forwarding the data message to its destination, the method in some embodiments might discard the data message in response to the set of service operations. For example, one of the service operations might be a firewall operation that specifies that the data message should be discarded.

After receiving the data message, the method in some embodiments identifies a set of one or more service operations that have to be performed on the data message. The method then associates a service tag to the data message, and supplies the service tag along with the data message to a message-processing engine of the SVM in order to identify the set of service operations that the SVM has to perform on the data message. In some embodiments, the set of service operations includes more than one operation, at least two different service containers on the SVM perform at least two different operations, and the service tag specifies a sequential chain of service operations.

In some embodiments, the method identifies the set of service operations to perform on a received data message by (1) comparing a set of header attributes of the data message with a set of matching criteria for each of several security profiles, (2) identifying a security profile that has a set of matching criteria that matches the data message's set of header attributes, and (3) retrieving the service tag from the identified security profile before associating the service tag with the data message. In other embodiments, the method does not retrieve the service tag from the identified security profile, but instead retrieves the identity of the set of service operations from the identified security profile, and then generates the service tag based on the retrieved identity of the set of service operations.

After receiving the data message, the method in other embodiments just determines that at least one service operation has to be performed on the data message. The method then supplies the data message to a message-processing engine of the SVM, which then identifies a set of service operations that have to be performed on the data message from a set of header attributes of the data message. In some of these embodiments, the SVM's message-processing engine (1) compares the data message's set of header attributes to sets of matching criteria of several security profiles to identify the security profile that has a set of criteria that match the set of header attributes, and (2) identifies the set of service operations from the identified, matching security profile.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
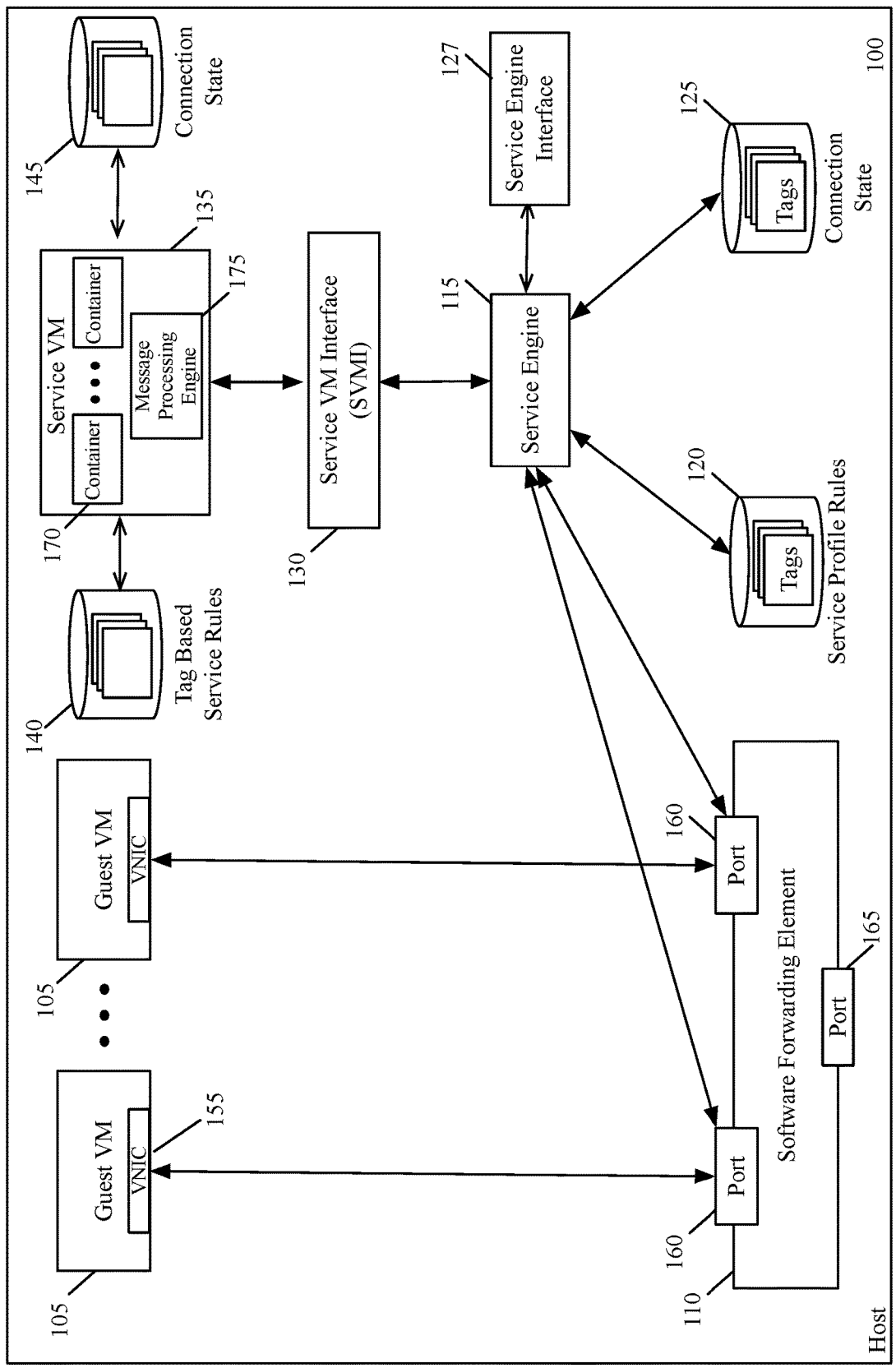
FIG. 1 illustrates a virtualization architecture of a host computer (e.g., a server) that implements the method of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for performing services on a host computer that executes several data compute nodes (DCNs). The method receives, at a module executing on the host, a data message associated with a DCN executing on the host. In some embodiments, the module is a port of a software forwarding element (SFE) that executes on the host to forward data messages to and from the DCNs executing on the host from and to DCNs and other machines operating outside of the host. The method supplies the data message to a service virtual machine (SVM) that executes on the host and on which several service software containers (service containers) execute. One or more of the service containers then perform a set of one or more services on the data message. The method then receives an indication from the SVM that the set of services has been performed on the data message. Examples of such services include firewall operations, load balancing operations, intrusion detection operations, other middlebox operations, etc.

In some embodiments, the method forwards the data message to the data message's destination after receiving the indication from the SVM. The data message's destination in some embodiments can be a DCN executing on the host, or a DCN or other machine operating outside of the host. Instead of forwarding the data message to its destination, the method in some embodiments might discard the data message in response to the set of service operations. For example, one of the service operations might be a firewall operation that discards the data message.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Software containers, on the other hand, are constructs that in some embodiments run on top of an operating system (e.g., an operating system of a host, a guest VM or a service VM) without the need for a hypervisor or separate guest operating system. In some embodiments, containers are set up through an operating-system-level virtualization in which the kernel of an operating system allows the existence of multiple isolated user-space instances (instead of just one). The host operating system of some embodiments uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates a virtualization architecture of a host computer (e.g., a server) that implements the method of some embodiments of the invention. Specifically, this virtualization architecture 100 includes a service engine 115 that (1) identifies a set of one or more service operations that have to be performed on a data message associated with one of the guest virtual machines (GVMs) executing on the host, (2) assigns a tag with the data message to identify a set of one or more service operations that have to be performed on the data message, and (3) provides the data message and its assigned tag to a SVM 135 so that one or more service containers 170 executing on this SVM can perform the set of service operations on the data message.

As shown, the virtualization architecture 100 includes several GVMs 105, a software forwarding element 110, a service engine 115, a rule data storage 120, a connection state data storage 125, a service engine interface 127, an SVM interface (SVMI) 130, an SVM 135, a service rule data storage 140, and a connection state data storage 145. As further shown, the SVM 135 includes several service containers 170 and a message-processing engine 175. In some embodiments, the software forwarding element 110, the service engine 115, the rule data storage 120, the connection state data storage 125, the service engine interface 127, and the SVMI 130 operate in the kernel space of a hypervisor executing on the host, while the GVMs 105, the SVM 135, the rule data storage 140, and the connection state data storage 145 operate in the hypervisor's user space.

The GVMs 105 are virtual machines executing on top of the hypervisor (not shown) that executes on the host. Examples of such machines include webservers, application servers, database servers, etc. In some cases, all the GVMs belong to one entity, e.g., an enterprise that operates the host. In other cases, the host executes in a multi-tenant environment (e.g., in a multi-tenant data center), and different GVMs may belong to one tenant or to multiple tenants.

As shown, each GVM 105 includes a virtual network interface card (VNIC) 155 in some embodiments. Each VNIC is responsible for exchanging messages between its VM and the software forwarding element 110. Each VNIC connects to a particular port of the software forwarding element 110. The software forwarding element 110 also connects to a physical network interface card (NIC) (not shown) of the host. In some embodiments, the VNICs are software abstractions of a physical NIC (PNIC) that are implemented by the virtualization software (e.g., by the hypervisor).

In some embodiments, the software forwarding element maintains a single port 160 for each VNIC of each VM. The software forwarding element 110 connects to a physical NIC (through a NIC driver (not shown)) to send outgoing messages and to receive incoming messages. In some embodiments, the software forwarding element 110 is defined to include a port 165 that connects to the PNIC's driver to send and receive messages to and from the PNIC.

The software forwarding element 110 performs message-processing operations to forward messages that it receives on one of its ports to another one of its ports. For example, in some embodiments, the software forwarding element tries to use data in the message (e.g., data in the message header) to match a message to flow based rules, and upon finding a match, to perform the action specified by the matching rule (e.g., to hand the message to one of its ports 160 or 165, which directs the message to be supplied to a destination GVM or to the PNIC).

In some embodiments, the software forwarding element 110 is a software switch, while in other embodiments it is a software router or a combined software switch/router. The software forwarding element 110 in some embodiments implements one or more logical forwarding elements (e.g., logical switches or logical routers) with software forwarding elements executing on other hosts in a multi-host environment. A logical forwarding element in some embodiments can span multiple hosts to connect GVMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the GVMs of one logical network from the GVMs of another logical network that is serviced by another logical forwarding element. A logical forwarding element can connect GVMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the GVMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

The ports of the software forwarding element 110 in some embodiments include one or more function calls to one or more modules that implement special input/output (I/O) operations on incoming and outgoing messages that are received at the ports. In some embodiments, one of these function calls can be to the service engine 115, which determines whether the service containers 170 of the SVM 135 have to perform one or more service operations for the data message, and if so, assigns a service tag to the data message and provides the data message and the service tag to the SVM 135.

Other examples of I/O operations that are implemented by the ports 160 include ARP broadcast suppression operations and DHCP broadcast suppression operations, as described in U.S. patent application Ser. No. 14/070,360, now issued as U.S. Pat. No. 9,548,965. Other I/O operations can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs, etc.) implement the I/O function call operations (such as the firewall function calls), instead of the ports 160.

For the service engine to perform its service check operation, the forwarding element port 160 that calls the service engine supplies a set of attributes of a message that the port receives. In some embodiments, the set of message attributes are message identifiers, such as traditional five tuple identifiers, which include the message's source identifier, destination identifier, source port, destination port, and protocol. Before supplying these identifiers to the service engine, the forwarding element port extracts these identifiers from a message that it receives. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

In some embodiments, the service engine performs its service check operation itself based on service profile rules that are stored in the service profile rule storage 120. To perform its service check operation, the service engine 115 tries to match the received messages identifying attribute set with corresponding attribute sets that are stored for the service rules. In some embodiments, the service engine 115 receives the service profile rules that it stores in its storage 120 through the service engine interface (SEI) 127 from one or more controllers, as further described below.

In some embodiments, each service rule in the data storage 120 is specified in terms of (1) the same set of message identifiers (e.g., five-tuple identifiers) that the service engine receives from the port, and (2) a service tag that specifies a set of one or more service operations that a set of service containers 170 of the SVM has to perform. An identifier in a service rule can be specified in terms of an individual value or a wildcard value in some embodiments. In other embodiments, the identifier can further be defined in terms of a set of individual values or a group identifier, such as a security group identifier, a compute construct identifier, a network construct identifier, etc.

To match a received set of message attributes with the rules, the service engine compares the received set of attributes with the associated identifiers (e.g., five-tuple identifiers) of the service rules stored in the service rule data storage 120. Upon identifying a matching rule that contains a service tag that specifies that a set of SVM containers 170 has to perform at least one service action, the service engine 115 supplies the data message along with the service tag to the message-processing engine 175 of the SVM 135. In some embodiments, the service rule data storage 120 is defined in a hierarchical manner to ensure that a message rule check will match a higher priority rule before matching a lower priority rule, when message's identifiers match multiple rules.

Also, in some embodiments, the service rule data storage 120 contains a default rule that specifies a default action for any message rule check that cannot match any other service rules; this default rule will be a match for all possible sets of message identifiers in some embodiments, and ensures that the service rule engine will return an action for all received set of message identifiers. In some embodiments, the default rule will specify no service tag or a null service tag, which indicates that the SVM 135 does not need to be called to perform any service operation on the data message.

Multiple messages can have the same message identifier attribute sets, e.g., when the messages are part of one flow that is associated with one communication session between two machines. Accordingly, after matching a data message with a service profile rule in the storage 120, the service engine of some embodiments stores the service tag of this rule in a connection state data storage 125, so that it can subsequently use this tag to process service checks for other messages with similar identifying attribute sets.

Specifically, the connection state data storage 125 in some embodiments stores the service tag that the service engine 115 identifies for different message identifier attribute sets. In some embodiments, the connection state data storage 125 stores each returned tag with an identifier (e.g., a five-tuple identifier and/or a hash value) that is generated from the matching message identifier attribute set. Before checking with the service rule data storage 120 for a particular message identifier attribute set, the service rule engine 115 of some embodiments checks the connection state data storage 125 to determine whether this storage has a cached service tag for this message identifier attribute set. If not, the service rule engine then checks the service rule data storage 120. When the connection state data storage has an entry for the particular message identifier attribute set, the service engine supplies the cached service of the matching entry to SVM 135 along with the data message.

The service engine 115 communicates with the SVM 135 through the SVMI 130, in order to have the SVM containers 170 perform a set of services on data messages. For this check, the service engine in some embodiments receives the set of message attributes (e.g., the five tuples) that the port identified for (e.g., extracted from) the message. The service engine 115 forwards the received data message to the SVM 135 through the SVMI 130 along with the service tag that the service engine identified.

The SVM's message processing engine 175 receives data messages and service tags that are supplied by the service engine 115. This message-processing engine uses rules stored in the tag-base service rule storage 140 to identify a set of service operations that have to be performed on a received data message. In some embodiments, each rule in this storage 140 stores a rule identifier and a service-chain action. The rule identifier of each rule in data storage 140 is expressed in terms of a service tag in some embodiments. In some embodiments, the service chain action of a rule in this storage includes a list of one or more service containers that the engine 175 has to call for the data message. When this list contains more than one container, the message-processing engine 175 calls the containers according to their order on the service-chain action list in some embodiments.

For a particular data message, the message-processing engine uses the message's supplied service tag to identify a rule in the tag-based service rule data storage 140 that has a matching service tag. When the message-processing engine finds a rule that has a rule identifier that matches the received data message's service tag (as supplied from the service engine 115), the message-processing engine 175 retrieves this rule's service chain action list, and passes the data message to the containers identified on this list according to their order on the list. Like the service profile rule storage 120, the service rule storage 140 in some embodiments stores the service rules in a hierarchical manner (that ensures that a message rule check will match higher priority rule before matching a lower priority rule), and/or stores a default rule that will match all received data messages.

As shown, the SVM 135 also has a connection state data storage 145. Whenever its message-processing engine 175 identifies a rule in the rule data storage 140 that matches the associated service tag of a message, this engine 175 not only has the set of containers (identified by the matching rule's service action list) perform a set of operations on the data message, but also stores the service action list in the connection state data storage 140 that it can subsequently use to process service checks for other messages with similar service tags. In some embodiments, the connection state data storage stores each service action list with a rule identifier (e.g., the service tag) for the message. Before checking with the data storage 140 for a particular service tag, the message-processing engine 175 checks the connection state data storage 145 to determine whether this storage has a cached service action list for this service tag. If not, the engine 175 checks the rule data storage 140. When the connection state data storage 145 has an entry for the message's associated service tag, the processing engine 175 has the set of containers (identified by the matching rule's service action list) perform a set of operations on the data message. Other embodiments do not use the connection state 145 for the SVM 135 and its processing engine 175 (e.g., because the storage 140 does not store that many tag-based service rules).

Figure 2:
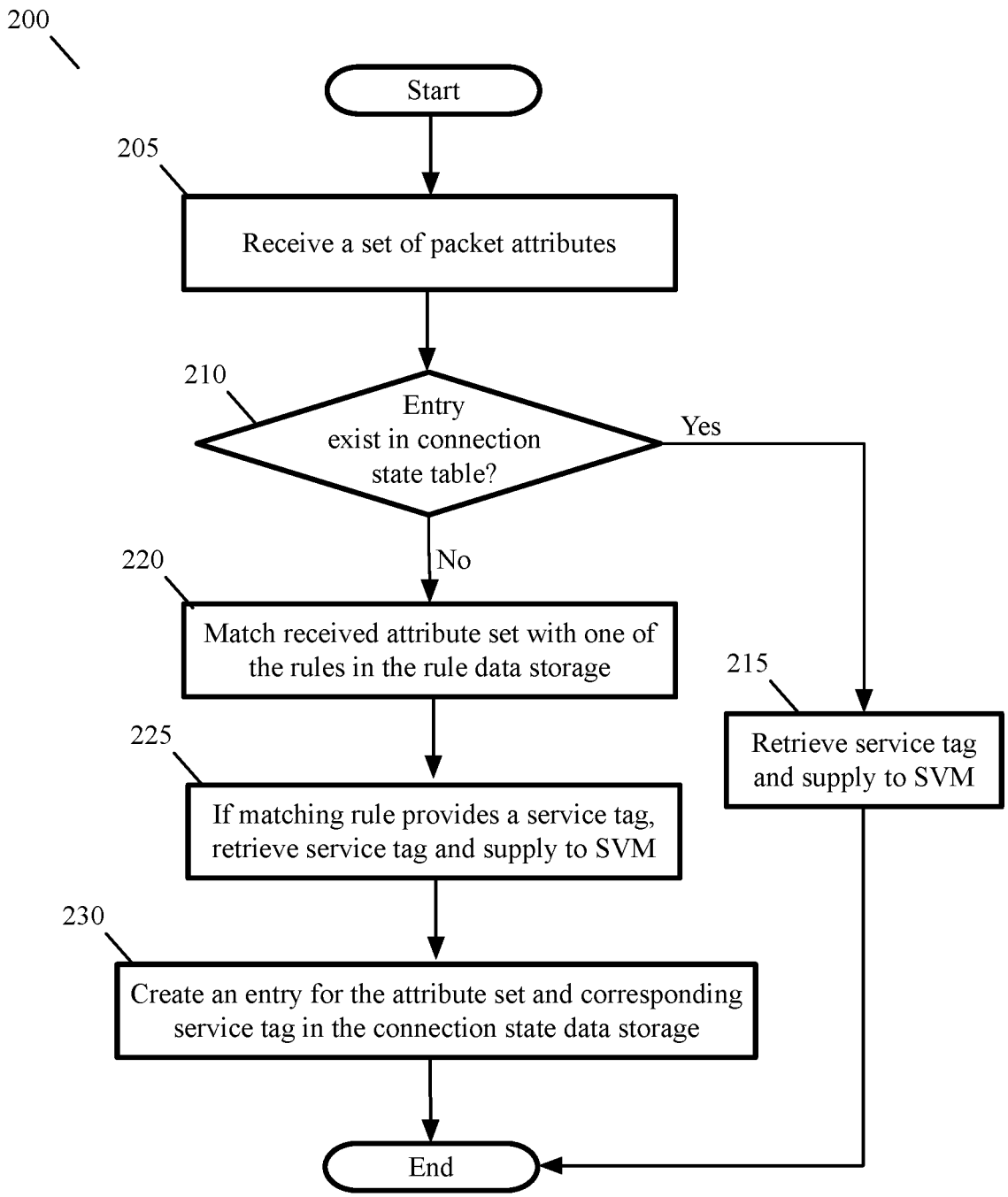
FIG. 2 conceptually illustrates a process that the service engine of FIG. 1 performs when a port calls it for a received message associated with a GVM connected to the port.

FIG. 2 conceptually illustrates a process 200 that the service engine 115 performs when a port 160 calls the engine 115 for a received message associated with a GVM 105 connected to the port 160. The received message in some embodiments can be a message sent by the port's GVM, or a message received for the port's GVM that the SFE 110 supplies to the port. As shown, the process 200 initially receives (at 205) a set of attributes (e.g., a set of L2, L3 and/or L4 header values) of the data message. In some embodiments, the received attributes are the message identifiers that the port extracted from the message. For instance, in some embodiments, the received attributes set includes the message's extracted five tuples.

Next, at 210, the process 200 determines whether it has an entry for the received message identifier attribute set in its connection state data storage 125. This is because the service engine may have previously performed a service rule check for another message with an identical set of attributes, and cached the result of this check in the connection state data storage 125. In some embodiments, the process examines the connection state data storage 125 for a record that has a record identifier that matches the received attribute set or a hash of the received attribute set.

When the process identifies (at 210) an entry in the connection state data storage 125 that matches the received message identifier attribute set, the process retrieves (at 215) a service tag that is stored in the identified entry of the connection state data storage 125. At 215, the process then supplies the cached service tag of the matching entry to SVM 135 along with the data message. The message-processing engine 175 then uses this service tag to determine the service action chain that it has to have one or more service containers 170 perform on the data message. After 215, the process 200 ends.

On the other hand, when the process cannot identify (at 210) an entry in the connection state data storage 125, the process identifies (at 220) the service profile rule in the service data storage 120 that matches the received message identifier attribute set. To identify the service profile rule, the process 200 searches the service rule data storage 120 to identify the entry that has an attribute set (e.g., has five tuples) that matches the received message identifier attribute set (e.g., match the five tuples extracted from the message).

In some embodiments, the service rule data storage 120 is defined in a hierarchical manner to ensure that a message rule check will match higher priority rule before matching a lower priority rule, when message's identifiers match multiple rules. Also, in some embodiments, the service rule data storage 120 contains a default rule that specifies a default action (e.g., no service) for any message rule check that cannot match any other service rules; this default rule will be a match for all possible sets of message identifiers, and ensures that the service rule engine will return an action for all received sets of message identifiers.

After identifying the matching service rule, the process 200 retrieves (at 225) a service tag that is stored in the identified entry of the service rule data storage 120. When this service tag specifies a service action, the process supplies (at 225) this service action along with the data message to SVM 135. The message-processing engine 175 then uses this service tag to determine the service action chain that it has to have one or more service containers 170 perform on the data message. When the service tag retrieved at 225 does not specify a service operation, the process 200 does not call (at 225) the SVM 135.

After 225, the process creates (230) an entry in the connection state data storage 125 for the received attribute set and stores the retrieved service tag (i.e., the tag retrieved at 225) in this entry. The process ends after 230. Although some of the above-described embodiments retrieve a service tag from a matching security profile rule, the service engine in other embodiments retrieves the identity of the set of service operations from the identified security profile, and then generates the service tag based on the retrieved identity of the set of service operations.

After the service engine calls the SVM to perform a set of service operations associated with a service tag that the process supplies to the SVM, the service engine 115 receives an indication from the SVM 135 that the set of services has been performed on the data message. In case the set of service operations performed by the SVM does not result in the dropping of the data message, the service engine provides the processed data message to the SFE 110 so that it can forward the data message to the data message's destination, which in some embodiments can be a GVM executing on the host, or a GVM or other machine operating outside of the host. When the set of service operations require the data message to be dropped (e.g., a firewall operation requires that the data message to be dropped), the service engine informs the SFE 110 that the data message should be dropped.

Figure 3:
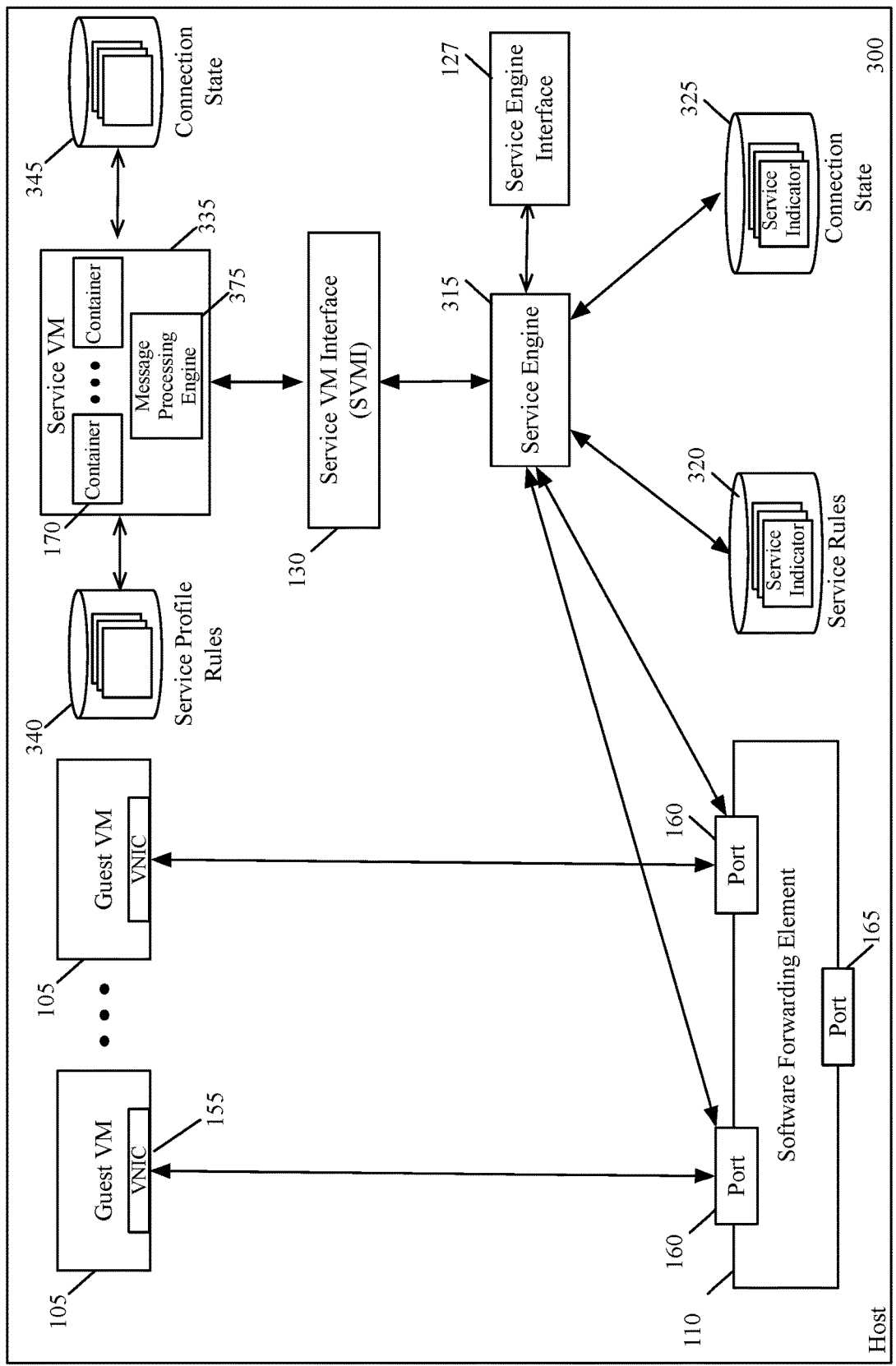
FIG. 3 illustrates a service engine that does not associate a received data message with a service tag when it determines that at least one service has to be performed for the data message.

In some embodiments, the host's service engine does not associate a received data message with a service tag when it determines that at least one service has to be performed for the data message. Instead, it just forwards the data message to the SVM after it determines that at least one service operation has to be performed on the data message. FIG. 3 illustrates one such service engine 315 of a host 300 of some embodiments. The virtualization and service architecture of host 300 is identical to that of host 100, except that in the architecture of FIG. 3 the service engine 315 does not associate a service tag with a data message because the SVM's message-processing engine 375 uses security profile rules (in its rule storage 340) that specify the service action chain in terms of the data message header values (e.g., five tuple header values).

The service engine 315 uses service rules in the service rule storage 320 to determine whether at least one service has to be performed on a data message that the engine is processing. In some embodiments, a service rule in this storage 320 has (1) a rule identifier expressed in terms of the received message identifier attribute set (e.g., five tuple header values) and (2) a service indicator that specifies whether at least one service has to be performed. The service indicator is a Boolean value in some embodiments. The service engine 315 caches the service indicator for the most-recently processed data message attribute sets in the connection state storage 325.

When the service indicator (in a cached record in the connection state storage 325 or of a matching service rule in the rule storage 320) for a received data message specifies that a service has to be performed on the data message, the service engine 315 supplies the data message along with its identifying attribute set (e.g., its five tuple header values) to the message-processing engine 375 of the SVM 335.

This message-processing engine 375 then identifies a set of service operations that have to be performed on the data message by matching the received data message identifier attribute set (e.g., its set of header attributes) with the identifiers of the rules in the service profile rule storage 340. In some embodiments, the service profile rule not only has a rule identifier (e.g., expressed in terms of the message identifier attribute sets, such as five tuple identifiers), but also includes a service action chain list that specifies a sequential chain of one or more service containers that the message-processing engine 375 has to call to process the received data message. The SVM 335 obtains the service profile rules for the storage 340 from one or more controllers through a controller interface of this SVM in some embodiments, or through the service engine interface 127 and the service engine 315 in other embodiments.

The SVM 335 also has a connection state data storage 345. Whenever its message-processing engine 375 identifies a rule in the rule data storage 340 that matches the received data message's attribute set, this engine 375 not only has the set of containers (identified by the matching rule's service action list) perform a set of operations on the data message, but also stores the service action list in the connection state data storage 340 that it can subsequently use to process service checks for other messages with similar message identifier attribute sets. In some embodiments, the connection state data storage stores each service action list with a rule identifier (e.g., the message identifier attribute set) for the message. Before checking with the data storage 130 for a particular message identifier attribute set, the message-processing engine 375 checks the connection state data storage 345 to determine whether this storage has a cached service action list for this identifying attribute set. If not, the engine 375 checks the rule data storage 340. When the connection state data storage 345 has an entry for the message identifier attribute set, the processing engine 375 has the set of containers (identified by the matching rule's service action list) perform a set of operations on the data message.

Figure 4:
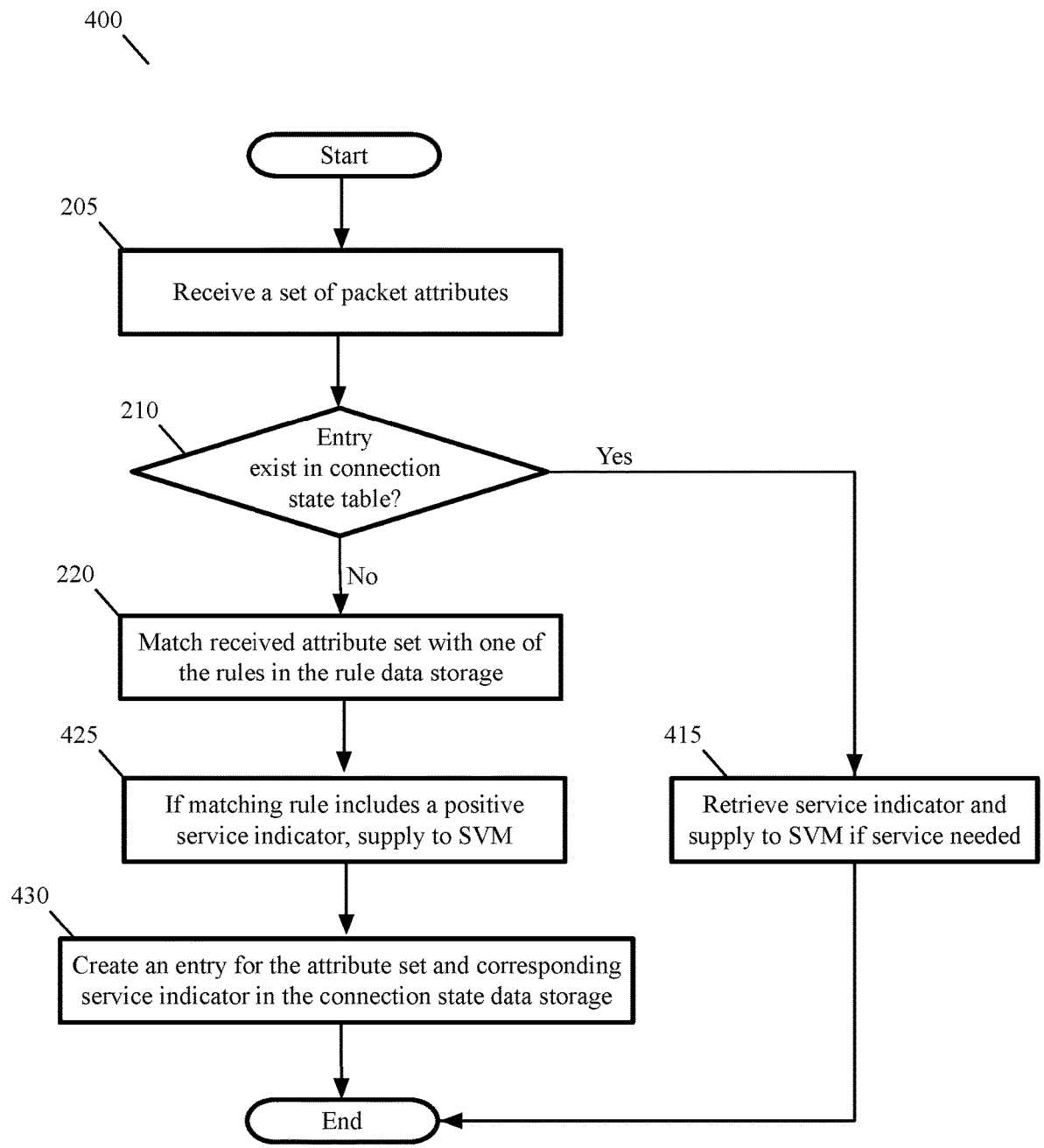
FIG. 4 conceptually illustrates a process that the service engine of FIG. 3 performs when a port calls it for a received message associated with a GVM connected to the port.

FIG. 4 conceptually illustrates a process 400 that the service engine 315 performs when a port 160 calls the engine 315 for a received message associated with a GVM 105 connected to the port 160. This process is identical to the process 200 except that the process 400 (1) retrieves (at 415 or 425) a service indicator from the connection storage 325 or the service rule storage 320 when it matches a received data message identifier attribute set to a record in the storage 325 or 320, (2) stores (at 430) a service indicator (instead of a service tag) in the connection storage 325, and (3) supplies (at 415 or 430) the data message without a service tag to the SVM 335, which then determines the service operation just based on the received data message identifier attribute set.

Figure 5:
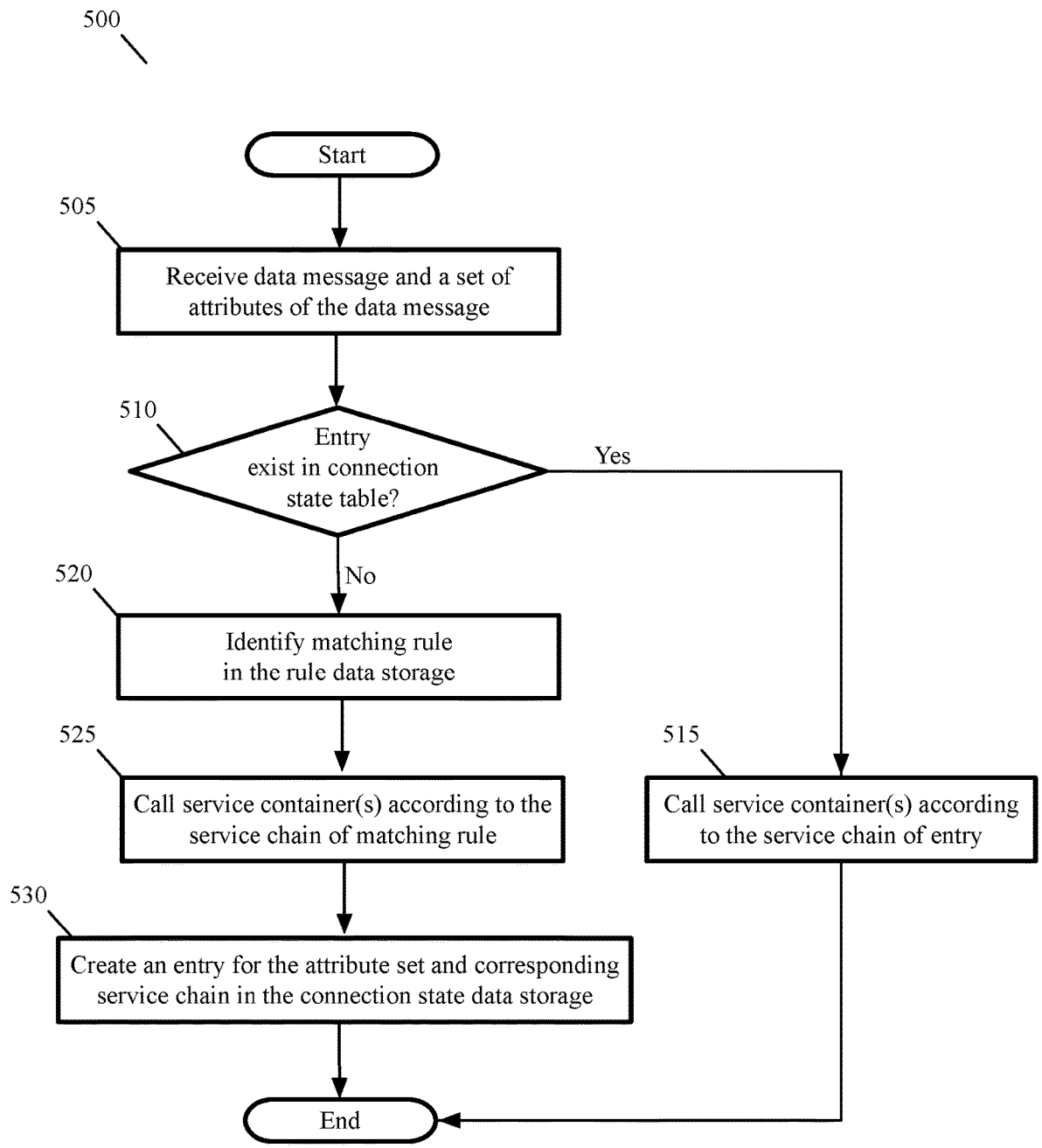
FIG. 5 conceptually illustrates a process that a message-processing engine performs when a service engine calls it to have it direct one or more service containers perform one or more service operations for a data message.

FIG. 5 conceptually illustrates a process 500 that the message-processing engine 175 or 375 performs when service engine 115 or 315 calls it to have it direct one or more containers 170 perform one or more service operations for a data message. As shown, the process 500 initially receives (at 505) a set of attributes of the data message. For the embodiments in which the service engine 115 associates a service tag with the data message, the attribute set is a service tag. On the other hand, in some embodiments in which the service engine 315 just passes along a data message to the SVM 335, the received attribute set is the message identifier attribute set (e.g., the message's five tuple identifier).

Next, at 510, the process 500 determines whether it has an entry for the received attribute set in its connection state data storage 145 or 345. This is because the message-processing engine may have previously performed a set of service operations for another message with an identical set of attributes, and cached the identity of this service operation set in the connection state data storage 145 or 345. In some embodiments, the process examines the connection state data storage 145 or 345 for a record that has a record identifier that matches the received attribute set or a hash of the received attribute set.

When the process identifies (at 510) an entry in the connection state data storage 145 or 345 that matches the received message attribute set, the process (at 515) retrieves a service action chain list that is stored in the identified entry of the connection state data storage 145 or 345, and passes the data message to one or more containers identified on this list according to their order on the list. When this list contains more than one container, the process 500 calls the containers according to their order on the service-chain action list in some embodiments. After 515, the process 500 ends.

On the other hand, when the process cannot identify (at 510) an entry in the connection state data storage 145 or 345, the process identifies (at 520) the service rule in the service data storage 140 or 340 that matches the received attribute set. To identify the service rule, the process 500 searches the rule data storage 140 or 340 to identify the entry that has an attribute set (e.g., a service tag or message identifier attribute set) that matches the received attribute set (e.g., the service tag or message identifier attribute set received from the service engine 115 or 315).

After identifying the matching service rule, the process 500 (at 525) retrieves a service action chain list that is stored in the identified entry of the service rule data storage 140 or 340, and passes the data message to one or more containers identified on this list according to their order on the list. When this list contains more than one container, the process 500 calls the containers according to their order on the service-chain action list in some embodiments. After 525, the process creates (530) an entry in the connection state data storage 145 or 345 for the received attribute set and stores the retrieved service action chain list in this entry. The process ends after 530.

In some embodiments, the service engine 315 does not check whether it has to have one or more service containers of the SVM 335 perform one or more services on a data message at the start of a new data message flow. In these embodiments, the service engine 315 forwards the first data message of a new data message flow to the SVM 335 and has it determine whether it needs to perform a set of service operations on the data messages of this new flow. The SVM 335 then forwards the result of this determination (i.e., of whether it should perform service operations on this flow's data messages) to the service engine 335, which then caches this result in its connection storage 325 for processing subsequent data messages of this new flow.

Figure 6:
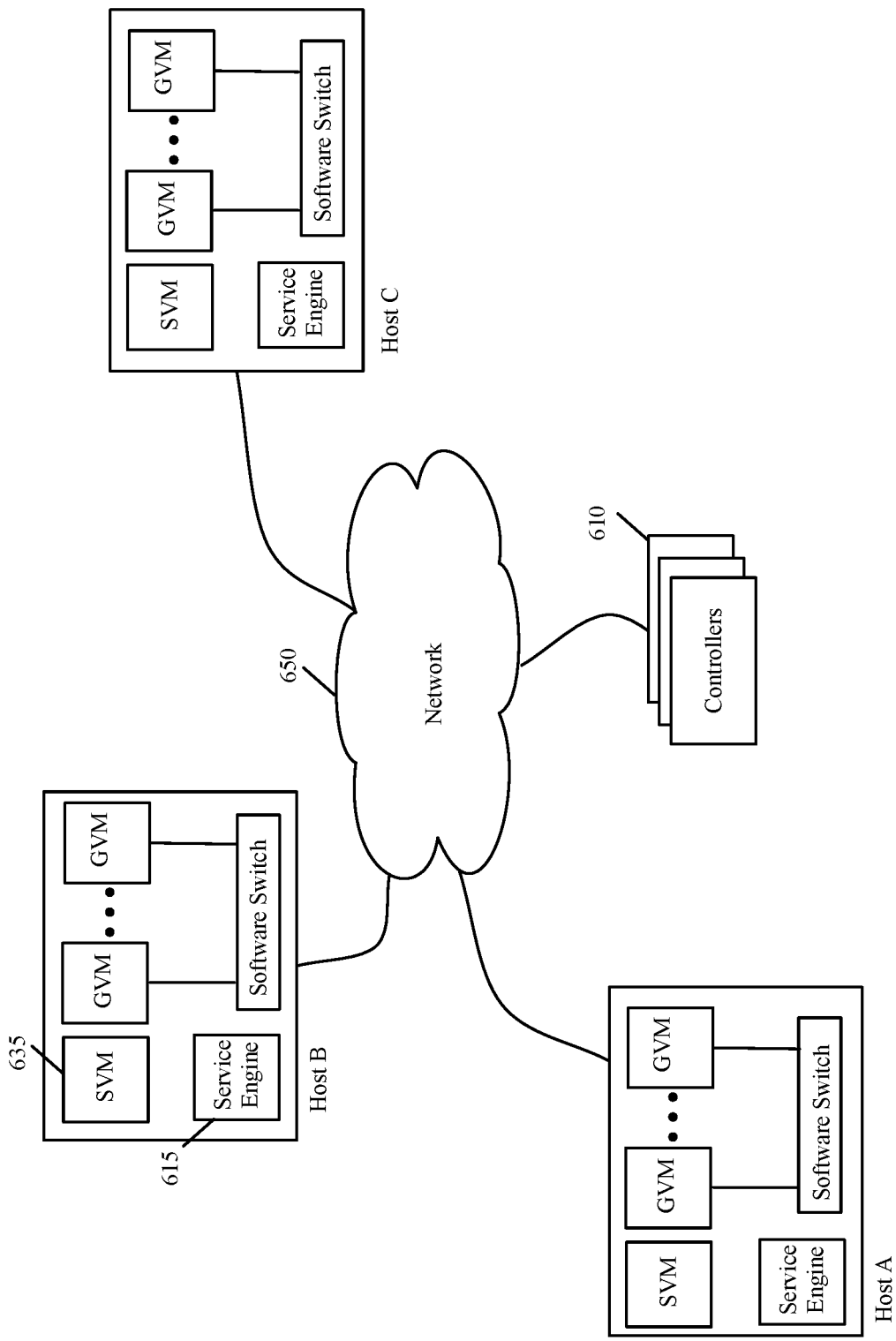
FIG. 6 illustrates an example of how the hypervisor service engines and the SVMs are managed in some embodiments.

FIG. 6 illustrates an example of how the hypervisor service engines 115 or 315 and the SVMs 135 or 335 are managed in some embodiments. This figure illustrates multiple hosts 600 in a datacenter. As shown, each host includes an SVM 635 (like the SVM 135 or 335) and a service engine 615 (like service engine 115 or 315). As shown, the SVMs 635 and service engines 615 are managed by one set of controllers 610. These controllers communicate with the hosts through a network 650 (e.g., through a local area network, a wide area network, a network of networks (such as the Internet), etc.). The hosts are also communicatively connected through this network 650.

In some embodiments, a datacenter operator maintains a service container registry. When the operator purchases network virtualization services (for providing logical networks) for a data center and provides the network virtualization services to their customers for managing networks in their cloud environment, the operator in some embodiments gets the ability to deploy an SVM on each host.

On this host, the network virtualization service provides a service engine filter that can be set off the ports of the SFE on the host. In some embodiments, the service engine pushes all data messages to the SVM without performing any network service. When the datacenter operator purchases the service partner's solutions, the partner container image is uploaded to the container registry maintained by the operator. The operator can install the service container application solution on this SVM. Based on the customer's purchase agreement, the service could be extended to the customer of the datacenter.

Under this approach, the deployment of a service will take a fraction of time. Current existing techniques use a virtualization compute manager to deploy an SVM install on a host, each time that another SVM is requested for a host. This approach slows down the addition of a service to a host. The container-based SVM approach of some embodiments, on the other hand, is rather fast because once the container-based SVM is installed on a host, new services can be quickly deployed for a customer by just enabling these services for the customer on this SVM. No new SVM needs to be deployed.

In some embodiments, the SVM runs a Linux Operating System. On this SVM, various socket, kernel and management tools will be pre-installed (such as dvfilterklib, vmci, vsock kernel, and VMtools of VMware Inc.). At time of install, the SVM also gets one or more modules installed and configured in order to allow a network virtualization controller to configure the SVM. For instance, in some embodiments, a rabbitmq client with an ovf parameter is set to the managing controller's IP address so that the client can access a rabbitmq server on the controller. This establishes the channel of communication between controller and the SVM.

In the control plane, any service command from the controller to the SVM will be relayed to the client running in the SVM. In some embodiments, the service profile rule data store and service instance are created in the SVM kernel. In the dataplane, there is a single filter added to the VNIC or SFE-port of a GVM. This filter will redirect the data messages to the SVM. Within the SVM, based on the service instance information received from the control plane, appropriate service will be provided to the message.

This approach reduces significant kernel memory consumption as well, since there will be only one fastpath agent and corresponding slowpath agent running at any given time. This approach also allows multiple services to be sequentially performed by multiple service containers by including a service chain list of containers in a security profile rule for a particular data message flow.

Many of the above-described features and applications are implemented as software processes that are specified as a set of instructions recorded on a computer readable storage medium (also referred to as computer readable medium).

When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
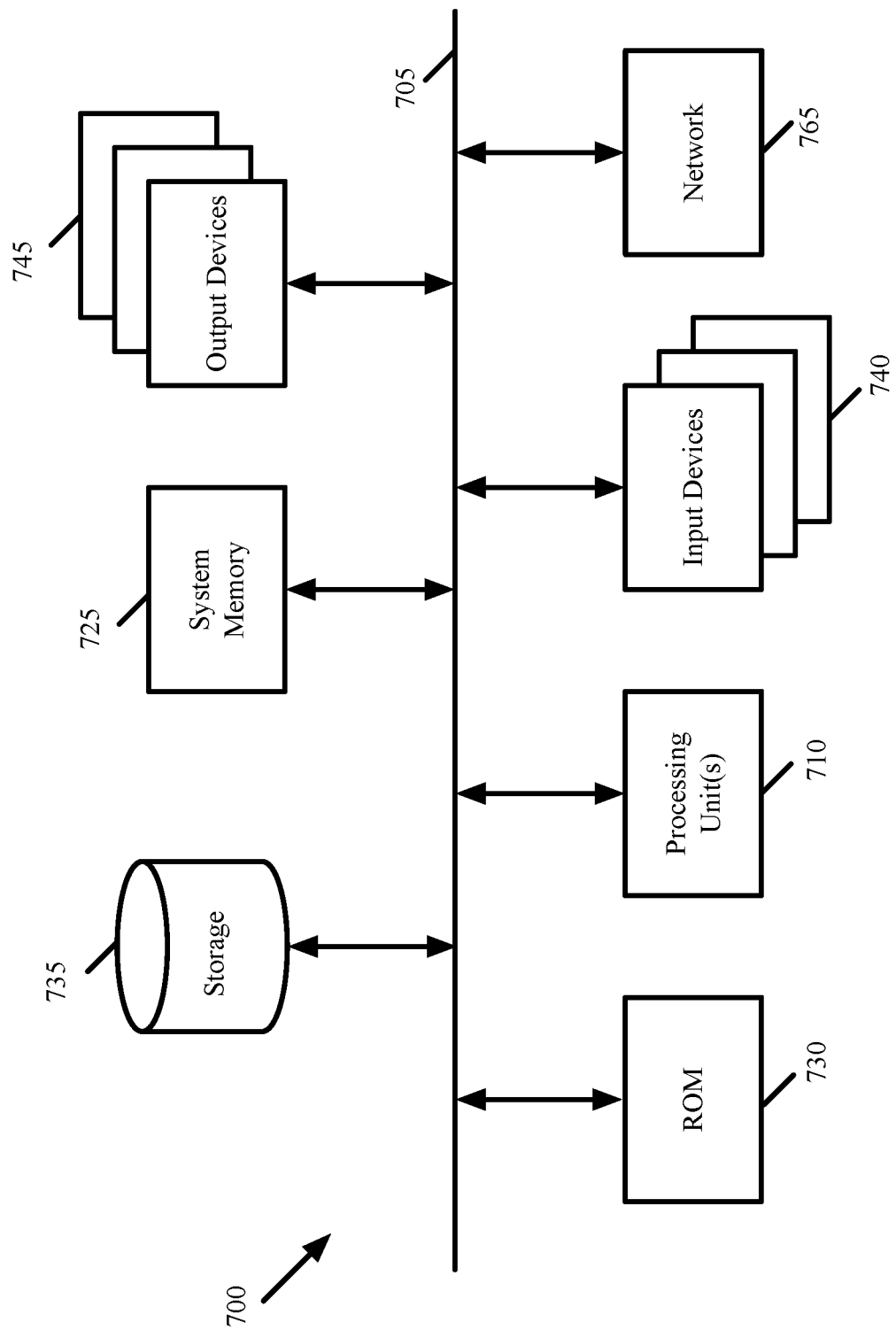
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of performing services on a host computer that executes a plurality of data compute nodes, the method comprising:
at the host computer:
receiving a data message associated with a data compute node (DCN) executing on the host;
using a set of header values extracted from the data message to identify a service tag from a plurality of service tags stored in a data store on the host computer, the service tag specifying a set of at least two middlebox service operations to perform on the data message;
supplying the data message along with the service tag to a message processing module executing on a service virtual machine (SVM) that executes on the host computer and on which a plurality of service containers executes to perform a plurality of middlebox service operations, the message processing module (i) using the service tag to identify a service rule that identifies a set of at least two service containers to perform the specified set of at least two middlebox service operations on the data message and (ii) passing the data message successively to the service containers identified by the service rule; and
after the set of at least two service containers have performed the set of at least two middlebox service operations on the data message, forwarding the data message to a destination of the data message.

2. The method of claim 1, wherein the middlebox service operations include at least two of firewall operations, load balancing operations, and intrusion detection operations.

3. The method of claim 1, wherein the data message's destination is a data compute node on the host computer.

4. The method of claim 1, wherein the data message's destination is a data compute node outside of the host computer.

5. The method of claim 1, wherein the data message's destination is either (i) a data compute node executing on another host computer, or (ii) a standalone machine operating outside and independently of the host computer.

6. The method of claim 1, wherein receiving the data message comprises receiving the data message at a software forwarding element executing on the host to forward data messages to and from the data compute nodes executing on the host computer from and to data compute nodes operating outside of the host computer.

7. The method of claim 1, wherein the data message is discarded in response to the middlebox service operations performed on the data message.

8. The method of claim 1, wherein the data message is sent by the DCN associated with the data message.

9. The method of claim 1, wherein the data message is a message received by the host computer for the DCN associated with the data message.

10. A method of performing services on a host computer that executes a plurality of data compute nodes, the method comprising:
at the host computer,
receiving a data message associated with a data compute node (DCN) executing on the host;
after receiving the data message, identifying a set of one or more services that have to be performed on the data message;
using a set of header values extracted from the data message to associate a service tag from a plurality of service tags stored in a data store on the host computer to the data message, the service tag specifying the set of services to perform on the data message;
supplying the service tag along with the data message to a service virtual machine (SVM) that executes on the host computer and on which a plurality of service containers that perform a plurality of services executes in order for the SVM to direct a set of service containers to perform the set of services identified by the service tag on the data message; and
after the set of services has been performed on the data message, forwarding the data message to a destination of the data message.

11. The method of claim 10, wherein identifying the set of services comprises:
comparing a set of header attributes of the data message with a set of matching criteria for each of a plurality of security profiles;
identifying a security profile that has a set of matching criteria that matches the data message's set of header attributes; and
retrieving the service tag from the identified security profile before associating the service tag to the data message.

12. The method of claim 10, wherein identifying the set of services comprises:
comparing a set of header attributes of the data message with a set of matching criteria for each of a plurality of security profiles;
identifying a security profile that has a set of matching criteria that matches the data message's set of header attributes;
retrieving identity of the set of services from the identified security profile; and
generating the service tag based on the retrieved identity of the set of services.

13. The method of claim 10, wherein the set of services includes more than one service, at least two different service containers on the SVM perform at least two different services, and the service tag specifies a chain sequence of services.

14. A non-transitory machine readable medium storing a program for performing services on a host computer that executes a plurality of data compute nodes, the program comprising sets of instructions for:
receiving, at the host computer, a data message associated with a data compute node (DCN) executing on the host;
using a set of header values extracted from the data message to identify a service tag from a plurality of service tags stored in a data store on the host computer, the service tag specifying a set of at least two middlebox service operations to perform on the data message;
supplying the data message along with the service tag to a messaging processing module executing on a service virtual machine (SVM) that executes on the host computer and on which a plurality of service containers executes to perform a plurality of middlebox service operations, the messaging processing module (i) using the service tag to identify a service rule that identifies a set of at least two service containers to perform the specified set of at least two middlebox operations on the data message and (ii) passing the data message successively to the service containers identified by the service rule; and forwarding, after the set of at least two service containers have performed the set of at least two middlebox service operations on the data message, the data message to a destination of the data message.

15. The non-transitory machine readable medium of claim 14, wherein the middlebox service operations include at least two of firewall operations, load balancing operations, and intrusion detection operations.

16. The non-transitory machine readable medium of claim 14, wherein the program further comprises sets of instructions for:

receiving a second data message associated with a second DCN executing on the host;

determining, after receiving the second data message, that at least one middlebox service has to be performed on the second data message;

supplying the data message to the message processing module, the message processing module (i) identifying a second set of at least two middlebox services that have to be performed on the second data message from a set of identifier attributes of the second data message and (ii) passing the second data message successively to a second set of at least two service containers that perform the second set of at least two middlebox services; and after the set of at least two service containers have performed the set of at least two middlebox service operations on the second data message, forwarding the second data message to a second destination of the second data message.

17. The non-transitory machine readable medium of claim 14, wherein the data message's destination is either (i) a data compute node executing on another host computer, or (ii) a standalone machine operating outside independently of the host computer.

18. The non-transitory machine readable medium of claim 14, wherein the set of instructions for receiving the data message comprises a set of instructions for receiving the message at a software forwarding element executing on the host to forward data messages to and from the data compute nodes executing on the host computer from and to data compute nodes operating outside of the host computer.

19. The non-transitory machine readable medium of claim 14, wherein the data message is discarded in response to the middlebox service operations performed on the data message.

20. A non-transitory machine readable medium storing a program for performing services on a host computer that executes a plurality of data compute nodes, the program comprising sets of instructions for:

receiving, at the host computer, a data message associated with a data compute node (DCN) executing on the host;

identifying, after receiving the data message, a set of one or more services that have to be performed on the data message;

using a set of header values extracted from the data message to associate a service tag from a plurality of service tags stored in a data store on the host computer to the data message, the service tag specifying the set of services to perform on the data message;

supplying the service tag along with the data message to a service virtual machine (SVM) that executes on the host computer and on which a plurality of service containers that perform a plurality of services executes in order for the SVM to direct a set of service containers to perform the set of services identified by the service tag on the data message; and after the set of services has been performed on the data message, forwarding the data message to a destination of the data message.

* * * * *